(12) United States Patent
Caspari et al.

(10) Patent No.: US 8,565,996 B2
(45) Date of Patent: Oct. 22, 2013

(54) METHOD FOR TRACTION CONTROL OF A MOTOR VEHICLE AND TRACTION CONTROL SYSTEM

(75) Inventors: Roland Caspari, Frankfurt (DE); Gerold Schneider, Ebsdorfergrund (DE)

(73) Assignee: Continental Teves A & Co. OHG, Frankfurt (DE)

( * ) Notice: Subject to any disclaimer, the term of this patent is extended or adjusted under 35 U.S.C. 154(b) by 25 days.

(21) Appl. No.: 13/375,510

(22) PCT Filed: May 26, 2010

(86) PCT No.: PCT/EP2010/057193
§ 371 (c)(1),
(2), (4) Date: Feb. 7, 2012

(87) PCT Pub. No.: WO2010/139574
PCT Pub. Date: Dec. 9, 2010

(65) Prior Publication Data
US 2012/0130616 A1 May 24, 2012

(30) Foreign Application Priority Data
Jun. 5, 2009 (DE) .......................... 10 2009 024 036

(51) Int. Cl.
*G06F 17/00* (2006.01)
*B60T 1/00* (2006.01)

(52) U.S. Cl.
USPC .......................................................... 701/82

(58) Field of Classification Search
USPC ...... 701/71, 78, 82, 83, 90, 91; 188/2 R, 4 R, 188/48, 72.3, 73.33, 271; 192/12 R, 144, 192/215, 220; 280/12.13
See application file for complete search history.

(56) References Cited

U.S. PATENT DOCUMENTS

| 5,010,489 A | 4/1991 | Masaki et al. |
| 6,536,408 B1 * | 3/2003 | Warner .......................... 123/323 |
| 2002/0007661 A1 | 1/2002 | Takahashi |

FOREIGN PATENT DOCUMENTS

| DE | 42 29 560 A1 | 3/1994 |
| DE | 196 54 769 A1 | 7/1998 |

(Continued)

OTHER PUBLICATIONS

"Die Fahrdynamikregelung von Bosch", Automatisierungstechnik—At, Oldenbourg Wissenschaftsverlag, Munich, DE, vol. 44, No. 7, Jul. 1, 1996, pp. 359-365.
International Search Report—PCT/EP2010/057193—Aug. 23, 2010.
German Search Report—Mar. 10, 2010.

*Primary Examiner* — Mary Cheung
(74) *Attorney, Agent, or Firm* — Brinks Hofer Gilson & Lione

(57) ABSTRACT

Disclosed is a traction control system and method for a vehicle having at least one driven wheel (R, L) with an associated wheel brake, an engine, and an electronic controller encompassing at least two linear sub-controllers designed for different coefficient of friction situations. Each of the at least two linear sub-controllers ($C_L$, $C_H$; $C_{LL}$, $C_{LH}$, $C_{HL}$, $C_{HH}$) determines a function of a control deviation (e) of at least one wheel specific characteristic, a control variable suggestion ($u_L$, $u_H$; $u_{LL}$, $u_{LH}$, $u_{HL}$, $u_{HH}$) that includes a control variable suggestion for the wheel brake and a control variable suggestion for the drive engine, and an output control variable (u) including an output control variable for the wheel brake and an output control variable for the drive engine, is determined from the control variable suggestions ($u_L$, $u_H$; $u_{LL}$, $u_{LH}$, $u_{HL}$, $u_{HH}$) by weighted addition (1).

13 Claims, 6 Drawing Sheets

(56) References Cited

FOREIGN PATENT DOCUMENTS

| DE | 101 16 353 A1 | 10/2001 |
| DE | 101 07 455 A1 | 1/2002 |
| DE | 101 22 614 A1 | 11/2002 |
| DE | 102004008265 A1 | 9/2005 |
| DE | 10 2004 062 722 A1 | 6/2006 |
| EP | 0 992 388 A1 | 4/2000 |
| EP | 1 021 326 B1 | 7/2000 |
| EP | 2 172 378 A1 | 4/2010 |

* cited by examiner

METHOD FOR TRACTION CONTROL OF A MOTOR VEHICLE AND TRACTION CONTROL SYSTEM

CROSS-REFERENCE TO RELATED APPLICATIONS

This application claims priority to German Patent Application No. 10 2009 024 036.5, filed Jun. 5, 2009 and PCT/EP2010/057193, filed May 26, 2010.

TECHNICAL FIELD OF THE INVENTION

The invention relates to a method for traction control of a vehicle and for influencing a drive torque of a drive engine, in which at least one controller serves for generating an output control variable for the wheel brake and an output control variable for the drive engine.

BACKGROUND OF THE INVENTION

DE 10 2004 008 265 A1 discloses a method for motor vehicles having a wheel slip control system, which has means for detecting wheel slip on one or more vehicle wheels, a wheel slip controller, which generates one or more wheel-specific control variables, and one or more actuators, which serve for adjusting the wheel slip by the wheel-specific control variable. For improving the control system, at least one wheel-specific control variable of the wheel slip controller is adjusted by a correction variable, representing the wheel normal force on the corresponding wheel, to a new control variable for the actuators.

Known traction controllers seek to set a target slip of the drive wheels through engine and braking interventions. Here the known traction controllers take the form of two independent controllers, that is to say the brake controller and the drive engine controller. Both controllers set their slip targets using the actuators available. For this purpose the brake controller relies exclusively on the brake actuator and the drive engine controller exclusively on the drive engine actuator. Since the brake controller and the drive engine controller may have different slip targets, the controller having the lowest slip target setting usually takes precedence.

The traction controller described above having two independent controllers for the brakes and the drive engine may lead, when both controllers are active, to the following problems. Owing to the isolation of the two controllers, the controllers are only capable of a delayed reaction to the interventions of the other controller. This can therefore result in both controllers overreacting in order to achieve their slip targets. Although the state of the art discloses corrections and complex rules to take account of the various dependent functions of the variables involved and to balance the two controllers, the benefit of these is only limited, owing to the fundamental disadvantages of a controller design having two independent controllers for the brakes and the drive engine. Furthermore, these corrections and complex rules are complicated to program in and thereby unmanageable. In addition, different slip targets of the two controllers may mean that the controller having the higher slip target has a tendency to abandon the control prematurely, because its target slip is greater than that of the other controller. Without the intervention of the controller having the higher slip target setting, however, the controller having the lower slip target cannot attain its target. A stationary operating point close to the minimum target slip setting is therefore often not located. This leads to unnecessary control interventions, which may sometimes be disturbing or uncomfortable for the driver.

The object of the invention, therefore, is to provide a method for traction control and a traction control system, which overcomes the aforementioned disadvantages.

SUMMARY OF THE INVENTION

The invention is based on the idea that the traction controller comprises at least two linear sub-controllers, which each determine a control variable suggestion both for the wheel brake and for the drive engine, and that the output control variable of the traction controller, which comprises an output control variable for the wheel brake and an output control variable for the drive engine, is determined from the control variable suggestions of the sub-controllers by weighted addition. Since each sub-controller is designed to determine a brake control variable and a drive engine control variable, better account is taken of the interactive effect of the drive engine and brake control.

According to the invention the term "wheel-specific characteristic" is taken to mean a generalization of the term wheel speed variable. The term therefore also embraces all other wheel rotational movement variables, which are directly linked to the wheel speed, such as, for example, the rotation time, the angular velocity or the rotational speed.

The wheel speed information from the wheel speed sensors of an antilock brake system (ABS) are preferably used as wheel-specific characteristics.

According to a preferred embodiment of the method according to the invention, the output control variable for the wheel brake is determined by weighted addition from at least the two control variable suggestions for the wheel brake of at least the two sub-controllers and the output control variable for the drive engine is determined by weighted addition from at least the two control variable suggestions for the drive engine of at least the two sub-controllers.

One problem in designing a traction controller is the pronounced non-linearity of the vehicle/road system to be controlled. A major reason for the non-linearity lies in the wheel forces on the wheels, which therefore greatly influence the system behavior. The controller is therefore advantageously designed in such a way that the wheel forces of the driven wheel(s) have an influence on the control strategy. For designing the controller, the wheel force of a driven wheel is preferably formulated as a weighted sum of at least two characteristic wheel forces. The wheel force of each driven wheel is more preferably represented as a weighted sum of at least two characteristic wheel forces, in order to obtain a uniform control of all driven wheels. Here each characteristic wheel force is represented as a linear function of the slip of the corresponding wheel having a preset gradient variable. The weighting of the individual characteristic wheel forces is preset in the form of weight functions according to a wheel force variable of the corresponding driven wheel, the wheel force variable of the corresponding wheel being determined from an actual wheel force and an actual wheel slip. This formulation of characteristic wheel forces that has been described allows the use of linear sub-controllers.

According to a development of the invention the weighted addition of the control variable suggestions of the sub-controllers is performed as a function of a wheel force variable of the driven wheel or of the wheel force variables of the driven wheels, the wheel force variable for each driven wheel being determined from an actual wheel force and an actual wheel slip. The actual wheel forces of the driven wheels are thereby taken into account in the output control variable of the traction controller, the results of the sub-controllers being weighted according to the situation actually prevailing. The wheel force variable is more preferably determined taking account of at least two preset gradient variables and at least two preset weight functions, which contain the wheel force variable as variable.

In order to afford a clear, simple interpretation, which also facilitates subsequent modifications of the controller, the values of the two gradient variables are preferably preset in such a way that the one characteristic wheel force corresponds to a situation, in which the wheel is in contact with a surface having a low coefficient of friction, and the other characteristic wheel force corresponds to a situation, in which the wheel is in contact with a surface having a high coefficient of friction.

In the case of a vehicle having a single driven wheel each linear sub-controller is preferably designed for one of the characteristic wheel forces.

In the case of a vehicle having at least two driven wheels the linear sub-controllers are designed for all different combinations of characteristic wheel forces of the driven wheels.

With two driven wheels, the controller preferably comprises four linear sub-controllers, a first sub-controller being designed for a combination of characteristic wheel forces, in which both wheels are in contact with a surface having a low coefficient of friction, a second and a third sub-controller each being designed for a combination of characteristic wheel forces, in which one of the two wheels is in contact with a surface having a low coefficient of friction whilst the other of the two wheels is in contact with a surface having a high coefficient of friction, and a fourth sub-controller being designed for a combination of characteristic wheel forces, in which both wheels are in contact with a surface having a high coefficient of friction.

An especially simple design of the controller is obtained if the wheel force of each driven wheel is regarded as the weighted sum of two characteristic wheel forces, one of the two weight functions being given simply by the wheel force variable of the corresponding wheel itself and the other weight function by the difference between one and the wheel force variable.

To take account of the contributions of the sub-controllers to the output control variable corresponding to the actual wheel force situation, the control variable suggestions of the sub-controllers, preferably weighted by respective weighting factors, are added to the output control variable, the weighting factors being determined from the wheel force variable of the wheel or the wheel force variables of the wheels on the basis of preset affiliation functions. Wheel force variable(s) and weighting factors are more preferably assigned by a fuzzy logic, in order to obtain the most differentiated representation possible of the actual situation.

Each sub-controller is preferably parameterized by at least one preset control parameter or control parameter set.

For improved adaptation of the controller to the wishes of the driver and/or to the actual driving situation, it is also preferable, however, that at least two different control parameters or control parameter sets be preset for at least one and in particular for each sub-controller, and that the controller should switch between the different control parameters or control parameter sets of the sub-controller or the sub-controllers as a function of an operating state, in particular a pushbutton switch state, and/or a driving condition, in particular the vehicle speed.

For determining the control variable suggestions, at least one secondary condition is preferably preset for the sub-controllers. The secondary condition is more preferably a setting for limiting the control variable suggestions. In this way physically meaningful control variable suggestions are obtained from each sub-controller.

According to a development of the invention each linear sub-controller is embodied as a state controller with integral feedback.

The invention also relates to a traction control system.

According to a preferred embodiment of the traction control system according to the invention, the controller comprises a switching logic, in which it is possible to switch between different control parameters or control parameter sets of the sub-controller or the sub-controllers as a function of a detected operating state, in particular a pushbutton switch state, and/or a detected driving condition, in particular the vehicle speed.

Some advantages of the invention over known traction control methods/systems are that the non-linearity is catered for very effectively, for the typically assumed wheel force pattern, sub-controllers can be designed on the basis of the linear control engineering, a simply structured and easily maintained control structure is obtained, and the controller on the vehicle can easily be adapted.

Further preferred embodiments are set forth in the following description of illustrative drawings.

DETAILED DESCRIPTION OF THE DRAWINGS

Figure 1:
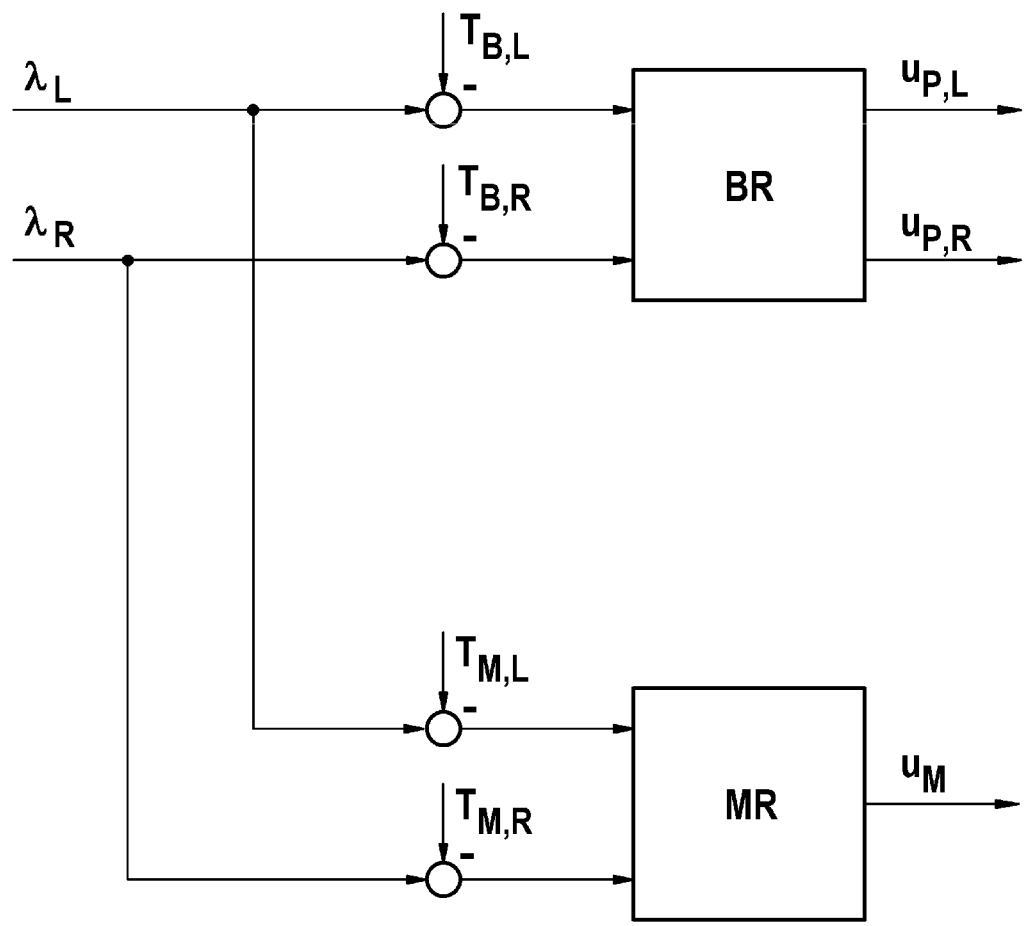
FIG. 1 shows a flow chart of a traction control according to the state of the art.

FIG. 1 shows a controller structure of a traction control for a vehicle having a driven right-hand (R) and left-hand (L) wheel according to the state of the art. The traction controller comprises two independent controllers, that is to say the brake controller BR and the drive engine controller MR. The slips of the left-hand $\lambda_L$ and right-hand $\lambda_R$ driven wheel are made available to both controllers BR and MR as input variables. In addition, corresponding slip thresholds $T_{B,L}$ and $T_{B,R}$ for both wheels are made available to the brake controller BR for the brake control, and corresponding slip thresholds $T_{M,L}$ and $T_{M,R}$ for the drive engine control are made available to the drive engine controller MR. The brake controller BR only emits control variables $u_{P,L}$ and $u_{P,R}$ for the wheel brakes and the drive engine controller BR only emits a control variable $u_M$ for the drive engine.

Figure 2:
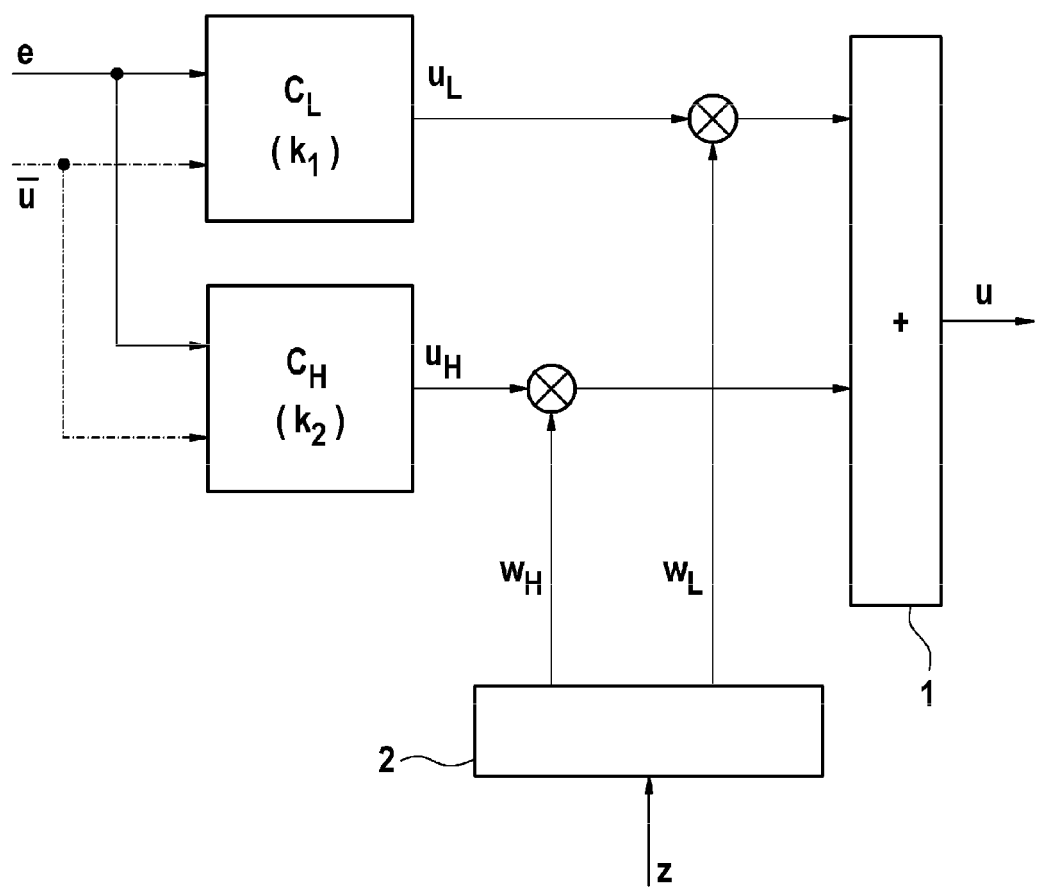
FIG. 2 shows a flow chart of a first exemplary embodiment of a traction control according to the invention.

FIG. 2 shows a controller structure of a first exemplary embodiment of a traction control according to the invention for a vehicle having one driven wheel. A set-point value $\omega_{set}$ of the wheel speed of the wheel is preset by an overriding structure of the traction control system. e denotes the control deviation between the actual wheel speed $\omega$ and the wheel speed set-point value $\omega_{set}$. The control deviation e is to be corrected to zero by the controller. The control deviation e is an input variable of the controller. The controller comprises two linear sub-controllers $C_L$ and $C_H$. Each of the two sub-controllers $C_L$, $C_H$ delivers a control variable suggestion $u_L$, $u_H$, which comprises both a control variable suggestion $u_{L,P}$, $u_{H,P}$ for the wheel brake and a control variable suggestion $u_{L,M}$, $u_{H,M}$ for the drive engine (mathematically represented as a vector, for example, i.e. $u_L=(u_{L,P}, u_{L,M})$ and $u_H=(u_{H,P}, u_{H,M})$). From the control variable suggestions $u_L$, $u_H$ of the two sub-controllers $C_L$ $C_H$ an (aggregate) output control variable u, which comprises a control variable $u_P$ for the wheel brake and a control variable $u_M$ for the drive engine (corresponding to $u=(u_P, u_M)$), is determined by weighted addition in block 1. Further, optional features of the exemplary embodiment represented in FIG. 2 are described below.

One problem in designing a traction control is the pronounced non-linearity of the vehicle/road system to be controlled. The main reason for the non-linearity lies in the wheel forces on the wheels. Low wheel forces, as on road surfaces with a low coefficient of friction, scarcely stabilize the wheel speeds. The system to be controlled has a tendency towards instability. High wheel forces, as on road surfaces with a high coefficient of friction, stabilize the wheel speed curve. The system to be controlled is inherently stable. The wheel forces therefore have a marked influence on the system behavior. The invention is therefore advantageously designed in such a way that the wheel forces constitute a decisive factor influencing the control strategy.

According to a development of the invention, a large number of possible wheel forces are represented by a weighted superimposition of several characteristic wheel forces. For each of the characteristic wheel forces a linear relationship exists between wheel force and slip. This allows the modeling of linear sub-systems and the design of linear sub-controllers for the sub-systems. The original non-linear system is rendered controllable in that the linear sub-controllers and their results, duly weighted, are superimposed. Here a weighting of the sub-controllers and their control variable suggestions is advantageously selected, which corresponds to the weighting of the characteristic wheel forces in the wheel force/wheel forces actually prevailing. The wheel forces actually prevailing therefore have a direct influence on the traction control.

These aspects of the development of the invention will first be explained below with reference to a vehicle having a single driven wheel, for example a motor cycle. An extension to vehicles having two or more driven wheels is then possible.

Figure 3:
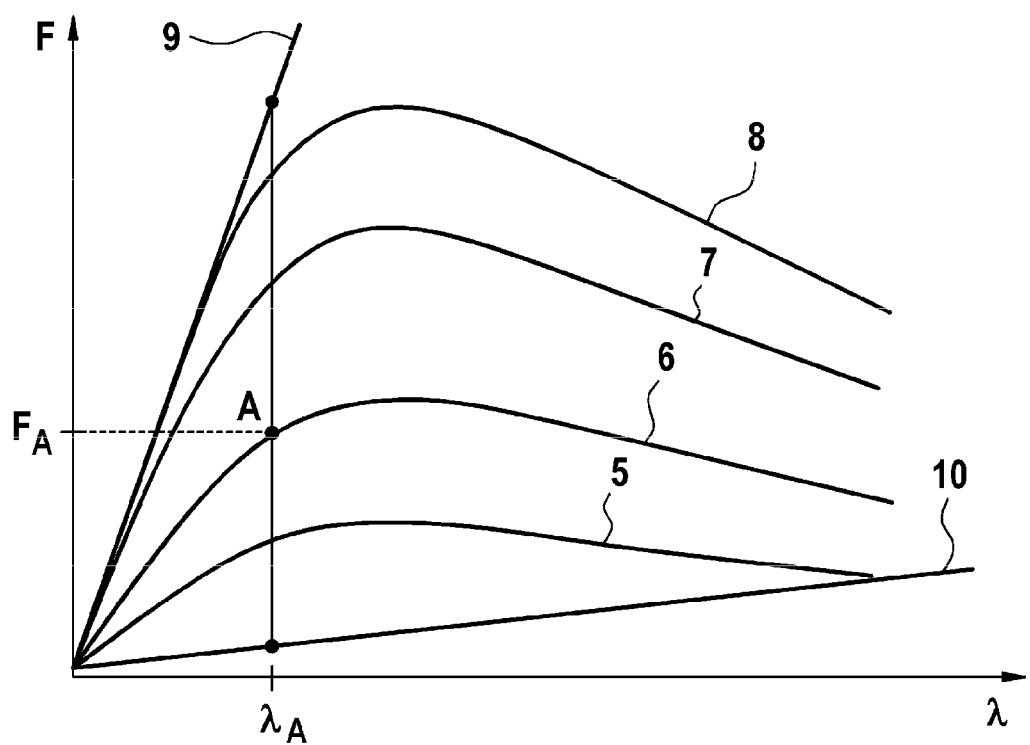
FIG. 3 shows examples of wheel force curves as a function of a wheel slip.

For a given coefficient of friction surface with a coefficient of friction p, the wheel motive force (wheel force, for short) F varies as a function of the wheel normal force $F_N$ and the relative wheel slip λ. FIG. 3 schematically shows four exemplary wheel force curves 5, 6, 7, 8 over the wheel slip λ. The various wheel force curves 5, 6, 7, 8 may derive from different coefficient of friction surfaces (different coefficients of friction μ) and/or normal forces $F_N$, but the precise cause is of no significance for the following. The wheel force curve 6 corresponds, for example, to a snow-covered surface, and the wheel force curve 8 corresponds, for example, to a dry asphalt surface.

For example, a wheel force F is represented as the weighted sum of i (at least two) characteristic wheel forces $F_i$ (i=1, 2, ..., N, where N≥2), each characteristic wheel force $F_i$ being a linear function of the wheel slip λ with a preset gradient $z_i$, the weighting of the individual characteristic wheel forces $F_i$ being formulated as (preset) weight functions $f_i(z)$, varying as a function of a variable z:

$$F(\lambda) = \sum_{i=1}^{N} f_i(z) \cdot F_i(\lambda) = \sum_{i=1}^{N} f_i(z) \cdot z_i \cdot \lambda \qquad (1)$$

The weight functions $f_i(z)$ are preferably normalized, that is to say:

$$\sum_{i=1}^{N} f_i(z) = 1 \text{ for all } z \qquad (2)$$

A subsequent normalization, dividing by the sum of equation (2), is also possible, however.

According to a simple exemplary embodiment, the wheel force F is represented by two characteristic wheel forces $F_{max}$ and $F_{min}$ (i=max, min; N=2). This is clearly shown in FIG. 3. The wheel force curves 5, 6, 7, 8 lie within an area bounded by two straight lines 9, 10, for example. Let the gradient of the straight lines 9 be denoted here by $z_{max}$, that is to say straight line 9 is described by the linear function $$F_{max}(\lambda) = z_{max} \cdot \lambda \qquad (3),$$

and similarly let the gradient of the straight line 10 be denoted by $z_{min}$, that is to say the straight line 10 is described by the linear function $$F_{min}(\lambda) = z_{min} \cdot \lambda \qquad (4).$$

Each point on one of the wheel force curves 5, 6, 7, 8 can be arrived at and represented by a combination of a point on the upper straight line 9 and the lower straight line 10.

If one considers a point A on the wheel force curve 6, for example, at which the wheel force $F_A$ is caused by the slip $\lambda_A$, the wheel force $F_A$ is now expressed by a combination of the two straight lines 9, 10, according to the following $$F_A(\lambda_A) = (1-z) \cdot F_{max}(\lambda_A) + z \cdot F_{min}(\lambda_A) = (1-z) \cdot z_{max} \cdot \lambda_A + z \cdot z_{min} \cdot \lambda_A \qquad (5)$$

where for the two weight functions $f_{max}(z)$ and $f_{min}(z)$, for example, the following functions of the variable z have been selected:

$$f_{min}(z) = z \qquad (6)$$

$$f_{max}(z) = 1-z$$

For the wheel force variable z the following then applies:

$$z = (F_A/\lambda_A - z_{max})/(z_{min} - z_{max}) \qquad (7)$$

i.e. the variable z (for given weight functions $f_{min}$, $f_{max}$ and gradients $z_{min}$, $z_{max}$) is defined by the (actual) values of the wheel force $F_A$ and slip $\lambda_A$.

Equation (5) divides the original, non-linear wheel force $F_A$ into two linear wheel forces $F_{max}$, $F_{min}$, which in the following are referred to as characteristic wheel forces. The characteristic wheel forces are combined via a weighting as a function of the variable z to obtain the wheel force F. Here the non-linearity is comprehended by the variable z.

For example, the wheel force F is therefore approximated by $$F(\lambda) = (1-z) \cdot z_{max} \cdot \lambda + z \cdot z_{min} \cdot \lambda \qquad (8)$$

as a function of the slip λ and the variable z. This formulation makes it possible to design two linear sub-models. The first sub-model is designed for the curve of a characteristic wheel force according to $z_{min} \cdot \lambda$ (corresponding to a low coefficient of friction μ, "low μ", L), and the second sub-model is designed for a characteristic wheel force curve according to $z_{max} \cdot \lambda$ (corresponding to a high coefficient of friction $\mu$, "high $\mu$", H).

Instead of the wheel force F varying as a function of the relative slip $\lambda$, the wheel force F is advantageously regarded as varying as a function of a wheel speed variable $\omega$ and the vehicle speed $\omega_{FZG}$, since braking and drive engine interventions act linearly on the wheel speed. It is of no significance for the non-linearity, however, whether it is expressed as a function of the relative or the absolute slip.

Instead of the equation (8) the equation $$F(\omega) = (1-z) \cdot z_{max} \cdot (\omega - \omega_{FZG}) + z \cdot z_{min} \cdot (\omega - \omega_{FZG}) \quad (9)$$

then results, where z is now given by $$z = \frac{\left(\frac{F}{\omega - \omega_{FZG}} - z_{max}\right)}{(z_{min} - z_{max})}. \quad (10)$$

A linear relationship can thereby now be established between the wheel speed $\omega$ of the driven wheel, the wheel force F and an external force $F_{extern}$. The external force $F_{extern}$ is generated, for example, by drive engine interventions and/or braking interventions. Assuming an inertia J on the wheel, the following two sub-models are arrived at:

Model Sub-System 1:

$$\frac{d(\omega - \omega_{FZG})}{dt} = -\frac{F(\omega)}{J} + \frac{F_{extern}}{J} = -z_{min} \cdot \frac{(\omega - \omega_{FZG})}{J} + \frac{F_{extern}}{J}$$

Model Sub-System 2:

$$\frac{d(\omega - \omega_{FZG})}{dt} = -z_{max} \cdot \frac{(\omega - \omega_{FZG})}{J} + \frac{F_{extern}}{J}$$

The two sub-models are combined, for example, through a weighting by the variable z (analogous to the wheel force F) to arrive at an aggregate model:

$$\frac{d(\omega - \omega_{FZG})}{dt} = \quad (11)$$
$$(1 - z) \cdot \left(-z_{max} \cdot \frac{(\omega - \omega_{FZG})}{J}\right) + z \cdot \left(-z_{min} \cdot \frac{(\omega - \omega_{FZG})}{J}\right) + \frac{F_{extern}}{J}$$

The aggregate model thus combined approximates fully to the original, non-linear model. In contrast to the non-linear original model, however, in the combined aggregate model the two linear sub-models and the non-linearity in z become more evident. This facilitates further design, if a linear controller, which influences the system behavior via the external force $F_{extern}$, is designed for each of the two linear sub-models:

Sub-Controller for Model Sub-System 1:

$$F_{extern,1} = k_1 \cdot (\omega - \omega_{FZG}) \quad (12)$$

Sub-Controller for Model Sub-System 2:

$$F_{extern,2} = k_2 \cdot (\omega - \omega_{FZG}) \quad (13)$$

Here the parameter $k_1$ or $k_2$ is a preset control parameter of the sub-controller $C_L$ of the sub-system 1 ("low $\mu$") or of the sub-controller $C_H$ of the sub-system 2 ("high $\mu$").

The two sub-controllers can be combined through a weighting by the variable z (analogous to the wheel force F) into an aggregate controller:

$$F_{extern} = (1-z) \cdot k_1 \cdot (\omega - \omega_{FZG}) + z \cdot k_2 \cdot (\omega - \omega FZG) \quad (14)$$

Here in the combination, that sub-controller $C_L$ or $C_H$, which in its design corresponds to a characteristic wheel force $F_{min}$ or $F_{max}$, which corresponds best to the wheel force F actually prevailing, is weighted most heavily by the variable z. Even through the sub-controllers are linear, the aggregate controller is a non-linear controller, owing to the weighting by z.

Returning to the first exemplary embodiment, schematically represented in FIG. 2, this means, for example, that the two linear sub-controllers $C_L$ and $C_H$ are designed for the two (preset) characteristic wheel force curves $F_{min}$ and $F_{max}$ and vary as a function of the sub-controller parameters $k_1$ and $k_2$. The sub-controller $C_L$ is accordingly designed for a characteristic wheel force $F_{min}$, in which the wheel stands on an extreme low coefficient of friction ("low $\mu$"), whilst the sub-controller $C_H$ has been designed for a characteristic wheel force $F_{max}$, in which the wheel stands on an extreme high coefficient of friction ("high $\mu$"). As has already been described above, each of the two sub-controllers $C_L$ and $C_H$ delivers a control variable suggestion $u_L$ or $u_H$. For example, from the wheel force variable z weighting factors $w_L$ and $w_H$ are determined in block 2 on the basis of preset affiliation functions. The control variable suggestions $u_L$ and $u_H$ are multiplied by the corresponding weighting factors $w_L$ and $w_H$ and in block 1 are added up to obtain the (aggregate) control variable u.

The control variable suggestions $u_L$, $u_H$ and the aggregate control variable u relate to all variables controlled in the traction control. In traction control by braking intervention on a wheel and control of the drive torque, the control variables $u_L$, $u_H$ and u each stand, for example, for the brake pressure in the wheel brake and the drive engine drive torque. The control variables $u_L$, $u_H$ and u (particularly also in the case of vehicles having more than one driven wheel described below) may therefore be multi-dimensional variables, for example ones described mathematically in the form of vectors.

On the gradient $z_{min}$, for example, the values of the wheel force variable z lie on an extreme low coefficient of friction ("low $\mu$"). The resultant weighting factors $w_L$ and $w_H$ are then determined as approximately $w_L$=100% and $w_H$=0%. They thereby select the sub-controller $C_L$ 100%. This is consistent with the idea, since the controller $C_L$ has been designed for gradients of $z_{min}$. Of the two controllers it best takes account of the extreme low coefficient of friction ("low $\mu$").

It has proved advantageous for the stability of the aggregate controller to preset additional conditions. The additional conditions are optionally fed into each sub-controller as input variables.

For example, account is taken of the additional conditions in the form of at least one control variable limit $\bar{u}$. This is represented by the dashed line in FIG. 3. The control variable limit $\bar{u}$ for the brake pressure/pressures and/or the drive engine torque is fed into the sub-controller $C_L$ and $C_H$ as input variable.

An extension of the principle described above to a vehicle (automobile) having two or four driven wheels is easily possible.

In accordance with what has been described above for a single driven wheel, for each driven wheel j, the wheel force $F^j$ is divided into a combination of at least two characteristic wheel forces $F^j_i$, for example into a combination of the two characteristic wheel forces $F_{min}$ and $F_{max}$ as described above.

For each of the given weight functions (e.g. $f_{min}(z)$ and $f_{max}(z)$) and gradients (e.g. $z_{min}$ and $z_{max}$) a wheel force variable $z^j$ is determined for each wheel j from the (actual) values of the wheel force $F^j$ and slip $\lambda^j$. With this formulation the non-linear aggregate model can be broken down again into linear sub-models, for each of which it is possible to design a linear sub-controller. The aggregate controller is again a non-linear controller owing to the weighting by the wheel force variable $z^j$. The couplings between the wheels results in more complex linear design models, which are nevertheless manageable with design methods known in the art. One example of an approach to this is the design via linear state controllers. Control variable limits can be taken into account via anti-windup measures.

Figure 4:
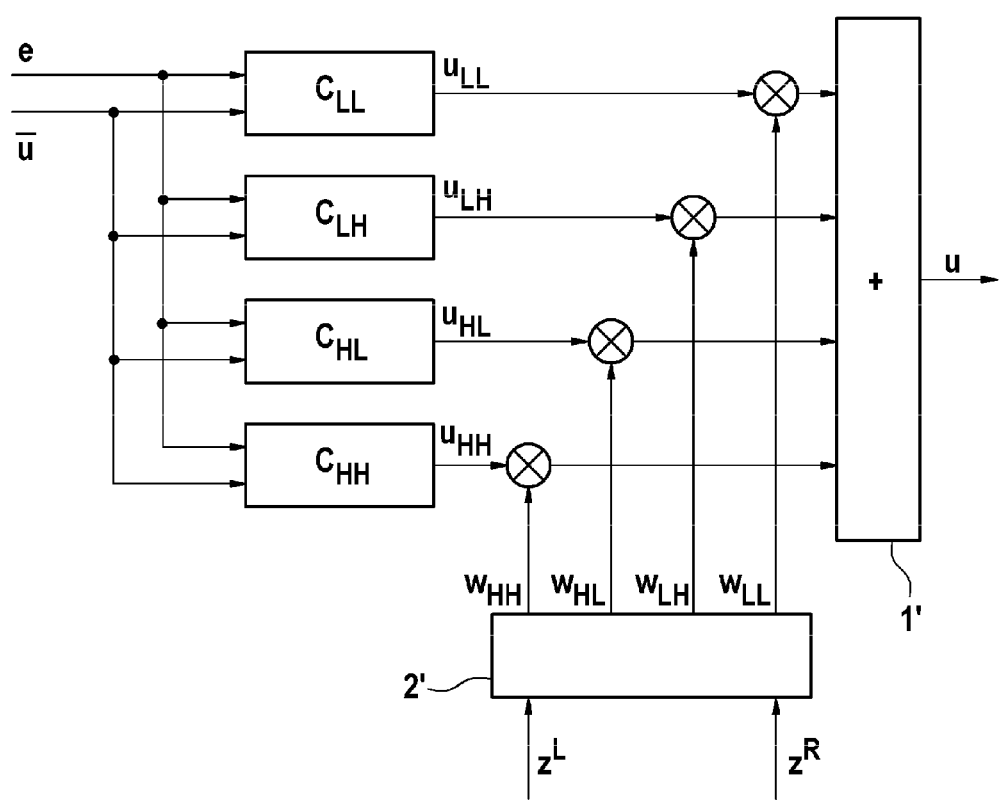
FIG. 4 shows a flow chart of a second exemplary embodiment of a traction control according to the invention.

FIG. 4 schematically represents a controller structure of a second exemplary embodiment of a traction control according to the invention for a vehicle having two driven wheels L (left-hand wheel) and R (right-hand wheel) (j=L, R). The control deviation e describes for each wheel L, R the difference between the actual wheel speed $\omega^j$ and the wheel speed set-point value $\omega^j_{set}$ (abbreviation: $e=(e^L, e^R)=(\omega^L_{set}-\omega^L, \omega^R_{set}-\omega^R)$), the set-point values $\omega^j_{set}$ being preset by an overriding structure of the traction control system. The control deviation e is to be corrected to zero by the controller. Besides the control deviation e, control variable limits $\bar{u}$ for the drive engine and/or the two wheel brakes are optionally fed into the controller as input variables.

Each of the four linear sub-controllers $C_{LL}$, $C_{LH}$, $C_{HL}$ and $C_{HH}$ has been designed for a combination of one of the characteristic wheel force curves for each of the two wheels L, R. Each sub-controller is optionally supplemented by anti-windup measures. The $C_{LL}$ controller, for example, has been designed for a combination of characteristic wheel forces, for which both wheels L, R stand on an extreme low coefficient of friction ("low μ" for wheel L, "low μ" for wheel R). Accordingly the $C_{HH}$-controller has been designed for a combination of characteristic wheel forces, in which both wheels L, R stand on an extreme high coefficient of friction. The $C_{LH}$ controller has been designed for a combination of characteristic wheel forces, for which the left-hand wheel L stands on an extreme low coefficient of friction ("low μ") and the right-hand wheel R stands on an extreme high coefficient of friction ("high μ"). Accordingly the controller $C_{HL}$ for the left-hand wheel L stands on an extreme high coefficient of friction ("high μ") and the right-hand wheel R on an extreme low coefficient of friction ("low μ"). Each of the sub-controllers $C_{LL}$, $C_{LH}$, $C_{HL}$ and $C_{HH}$ is described by another parameter set $P_{LL}$, $P_{LH}$, $P_{HL}$ and $P_{HH}$.

Each sub-controller $C_{LL}$, $C_{LH}$, $C_{HL}$ and $C_{HH}$ emits a control variable suggestion $u_{LL}$, $u_{LH}$, $u_{HL}$ and $u_{HH}$ respectively. In block 2' the respective weighting factors $w_{LL}$, $w_{LH}$, $w_{HL}$ and $w_{HH}$ of the sub-controllers $C_{LL}$, $C_{LH}$, $C_{HL}$ or $C_{HH}$ are determined from the wheel force variables $z^L$, $z^R$ of the two wheels L, R on the basis of preset affiliation functions. In block 1' the control variable suggestions $u_{LL}$, $u_{LH}$, $u_{HL}$ and $u_{HH}$ of the sub-controllers $C_{LL}$, $C_{LH}$, $C_{HL}$ or $C_{HH}$, weighted according to the weighting factors $w_{LL}$, $w_{LH}$, $w_{HL}$ and $w_{HH}$ are then added up to obtain the aggregate control variable u. The account taken of the control variable suggestions $u_{LL}$, $u_{LH}$, $u_{HL}$ and $u_{HH}$ of the sub-controllers $C_{LL}$, $C_{LH}$, $C_{HL}$ and $C_{HH}$ in the aggregate control variable u therefore varies as a function of the two wheel force variables $z^L$ and $z^R$.

The non-linearity of the system is registered through the weighted superimposition of the controllers and their results as a function of the wheel force variables and hence the wheel forces. This superimposition may be understood as an internal gain-scheduling process.

According to the explanations given above regarding FIG. 2, the control variables $u_{LL}$, $u_{LH}$, $u_{HL}$, $u_{HH}$, u, $\bar{u}$ represent multi-dimensional quantities (mathematically: vectors). In the case of traction control through braking intervention on the driven wheels and control of the drive torque, each of the control variables represents the brake pressures on the wheel brakes and the drive engine drive torque.

Figure 5:
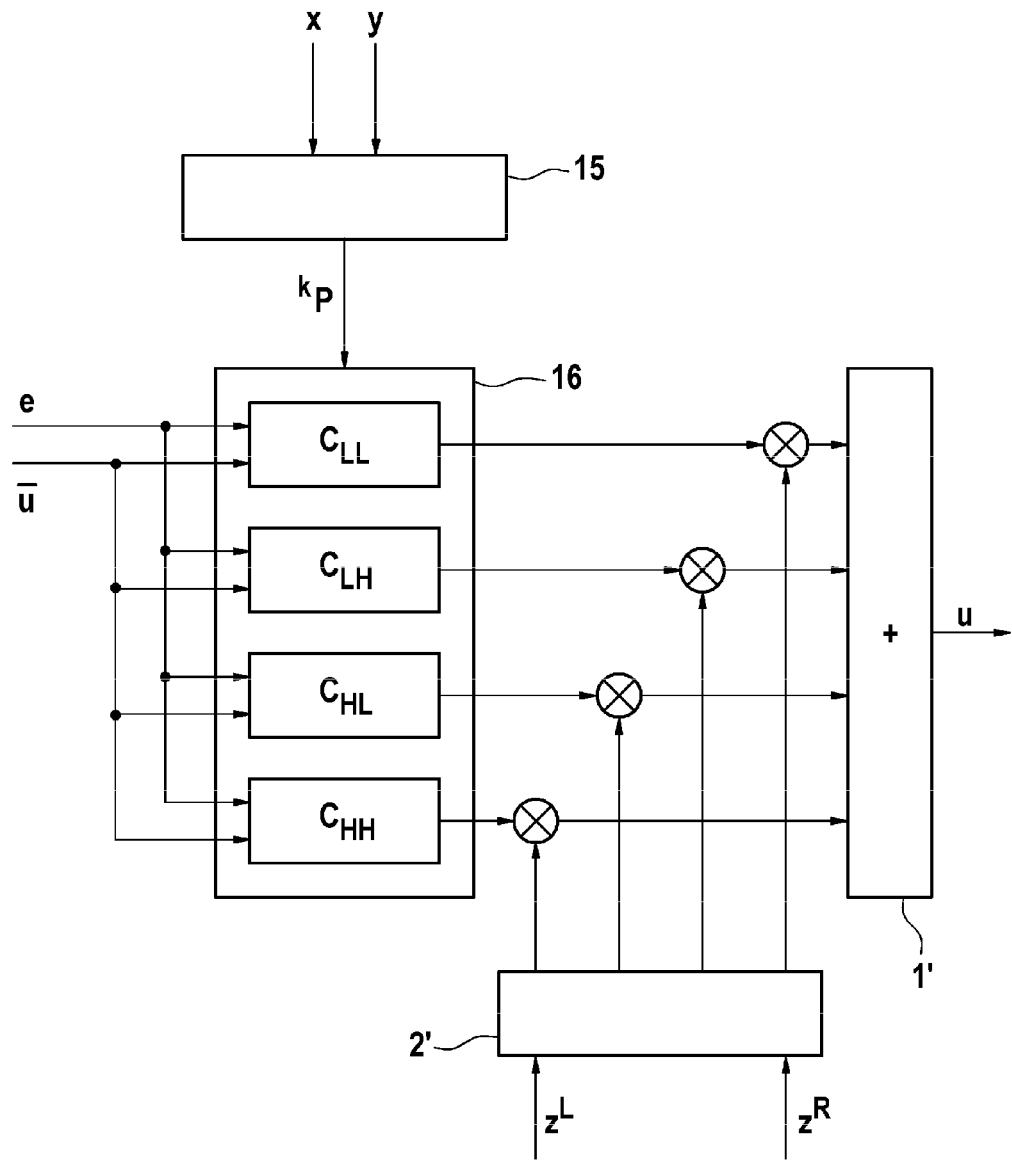
FIG. 5 shows a flow chart of a third exemplary embodiment of a traction control according to the invention.

FIG. 5 schematically represents a controller structure of a third exemplary embodiment of a traction control according to the invention for a vehicle having two driven wheels L (left-hand wheel) and R (right-hand wheel) (j=L, R). In an extension of the controller structure described with reference to FIG. 4, the parameter sets of the four sub-controllers $C_{LL}$, $C_{LH}$, $C_{HL}$ and $C_{HH}$ can be switched or adapted to two or more different parameter sets per controller.

In block 15 a specific parameter set $^kP_{LL}$, $^kP_{LH}$, $^kP_{HL}$ and $^kP_{HH}$ (abbreviation: $kP=(^kP_{LL}, ^kP_{LH}, ^kP_{HL}, ^kP_{HH})$) is selected for each sub-controller $C_{LL}$, $C_{LH}$, $C_{HL}$ and $C_{HH}$ as a function of an operating state X of the vehicle and/or a driving condition Y of the vehicle.

The selection/detection of an operating state X is performed, for example, by the driver operating a pushbutton switch. As a function of the pushbutton switch state, operating states such as normal mode, sports mode or off-road mode, for example, are detected, for which different controller parameter sets $^kP$ (k=1, 2, ...) are preset, which correspond to different controller designs (e.g. more stability or more traction). In this way the traction control takes account of the driver's wishes.

In addition or as an alternative, driving conditions Y, for example, are detected on the basis of sensor information available in the vehicle. The signals from a yaw rate sensor and/or an acceleration sensor and/or a steering angle sensor and/or a wheel speed sensor are used for this purpose, for example. On the basis of the sensor information, the corresponding controller parameter set $^kP$ for the actual driving situation is then optimally selected via a logic in block 15. Typical driving situations, for which an automatic driving state detection with adjustment of the traction control is advantageous, are starting sequences and high coefficient of friction cornering, for example.

In block 16 the parameter sets of the sub-controllers $C_{LL}$, $C_{LH}$, $C_{HL}$ and $C_{HH}$ are switched to the parameter sets $^kP$ selected in block 15.

Figure 6:
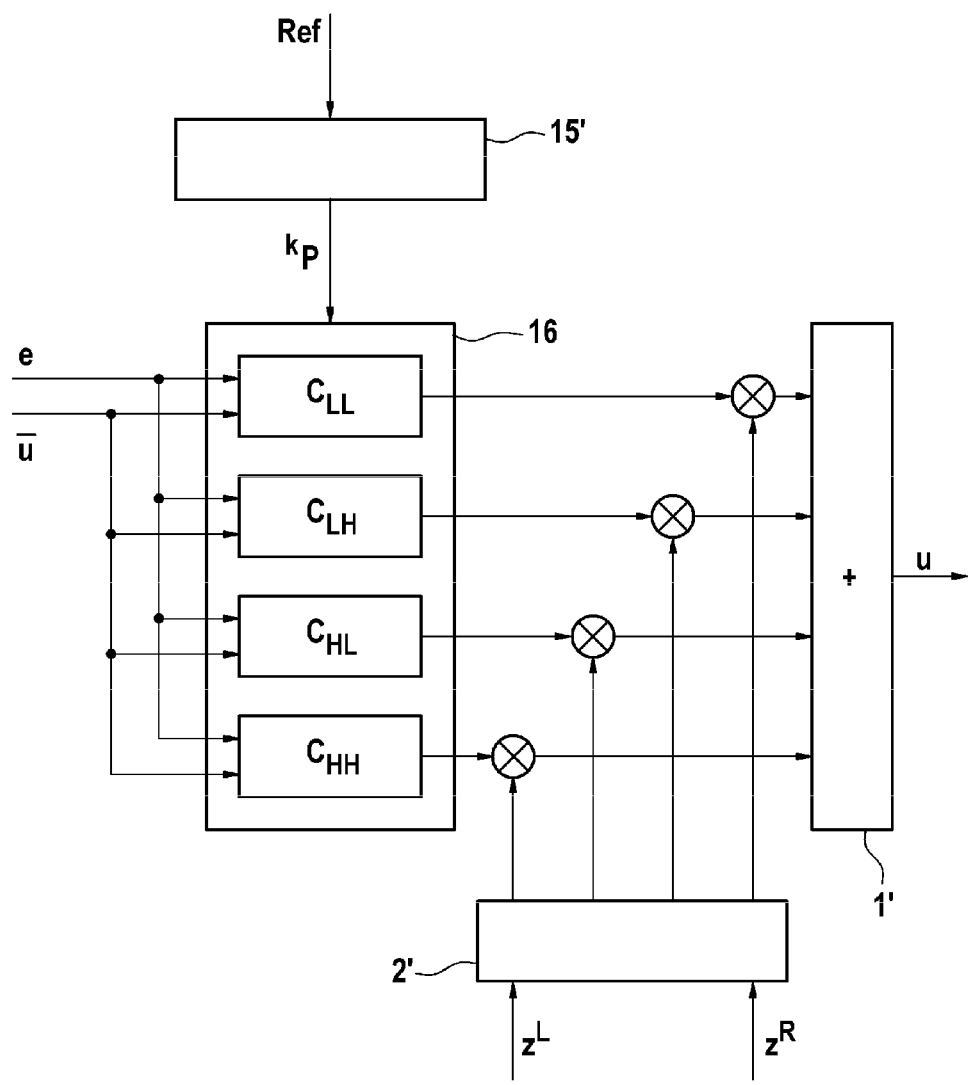
FIG. 6 shows a flow chart of a fourth exemplary embodiment of a traction control according to the invention.

The fourth exemplary embodiment represented in FIG. 6 largely corresponds to the third exemplary embodiment represented in FIG. 5. The vehicle speed Ref, for example, is used as the quantity for characterizing the driving condition Y. In block 15' the parameter sets $^kP$ of the four sub-controllers $C_{LL}$, $C_{LH}$, $C_{HL}$ and $C_{HH}$ are selected as a function of the vehicle speed Ref, and in block 16 the parameter sets of the sub-controllers $C_{LL}$, $C_{LH}$, $C_{HL}$ and $C_{HH}$ are switched to the selected parameter sets $^kP$.

The extension to switchable or adaptable parameter sets of the sub-controllers may be understood as an external gain-scheduling process, which serves for adjusting the sub-controller parameters to set operating modes and/or driving conditions, in order to improve the control behavior. This structure affords additional degrees of freedom for the adjustment of the controller.

The division into an internal and an external gain-scheduling process has the advantage of a division of functions. The internal gain-scheduling process takes account of the heavy dependence of the control system on the road surface. The external gain-scheduling process allows the sub-controllers to be adapted to different application objectives.

The sub-controllers $C_L$, $C_H$ and $C_{LL}$, $C_{HL}$, $C_{LH}$, $C_{HH}$ are linear state controllers with integral feedback, for example.

The sub-controllers $C_L$, $C_H$ and $C_{LL}$, $C_{HL}$, $C_{LH}$, $C_{HH}$ are supplemented by anti-windup measures, for example, in order to take account of control variable limits U.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A traction control method for a vehicle of the type having a driven wheel with an associated wheel brake, a drive engine, and an electronic controller with a first linear sub-controller and a second linear sub-controller, the method comprising the steps of:
determining at least one wheel-specific characteristic;
from the at least one wheel-specific characteristic, generating in the first linear sub-controller a first suggested output control variable in accordance with a first model driving condition, the first suggested output control variable comprising a first suggested brake output control variable for the wheel brake associated with the driven wheel and a first suggested engine output control variable for the drive engine,
from the at least one wheel-specific characteristic, generating in the second linear sub-controller a second suggested output control variable in accordance with a second model driving condition, the second suggested output variable comprising a second suggested brake output control variable for the wheel brake associated with the driven wheel and a second suggested engine output control variable for the drive engine,
carrying out a weighted addition of the first and second suggested output control variables based on actual driving conditions to calculate a combined output control variable comprising a combined brake output control variable and a combined engine brake control variable,
controlling the wheel brake of the driven wheel according to the combined brake output control variable and the drive engine in according to the combined engine output control variable.

2. The method as claimed in claim 1, wherein the weighted addition of the first and second suggested output control variables of the first and second linear sub-controllers is performed as a function of a wheel force variable of the at least one driven wheel, the wheel force variable for the at least one driven wheel being determined from an actual wheel force an actual wheel slip via at least two preset gradients and at least two preset weight functions.

3. The method as claimed in at least one of claim 2, wherein the first suggested output control variable is multiplied with a first weight function being a linear function of the wheel force variable and the second suggested output control variable is multiplied by a second weight function being a linear function of the difference between 1 and the wheel force variable.

4. The method as claimed in claim 2, wherein the weight functions are determined on the basis of preset affiliation functions.

5. The method as claimed in claim 1, further comprising that:
the first suggested output control variable is a first characteristic wheel force and the second suggested output control variable is a second characteristic wheel force, the first characteristic wheel force being a linear function of a slip of the driven wheel having a first constant gradient, the second characteristic wheel force being a linear function of the slip of the driven wheel having a second constant gradient
the combined output control variable is a wheel force associated with the driven wheel obtained by the weighted addition of the first and second characteristic wheel force, the weighted addition of the at least two characteristic wheel forces being performed in accordance with weight functions as a function of a wheel force variable of the driven wheel, the wheel force variable being determined from an actual wheel force and an actual wheel slip.

6. The method as claimed in claim 5, wherein the two gradients are preset in such a way that the first characteristic wheel force corresponds to a situation, in which the driven wheel is in contact with a surface having a low coefficient of friction, and the second characteristic wheel force corresponds to a situation, in which the wheel is in contact with a surface having a high coefficient of friction.

7. The method as claimed in claim 5, wherein the vehicle has two driven wheels, a third linear sub-controller, and a fourth linear sub-controller, each of the four linear sub-controllers calculating a respective suggested control output variable for one of four different combinations of characteristic wheel forces associated with the driven wheels.

8. The method as claimed in claim 7, the first sub-controller calculating the first suggested control output variable for a combination of characteristic wheel forces, in which the two driven wheels are in contact with a surface having a low coefficient of friction, the second sub-controller and the third sub-controller calculating the second and a third suggested control output variable for a respective combination of characteristic wheel forces, in which one of the two driven wheels is in contact with a surface having a low coefficient of friction whilst the other of the two driven wheels is in contact with a surface having a high coefficient of friction, and the fourth sub-controller calculating a fourth suggested control output variable for a combination of characteristic wheel forces, in which the two driven wheels are in contact with a surface having a high coefficient of friction.

9. The method as claimed in claim 1, wherein each of the first and second linear sub-controllers is defined by at least one preset set of control parameters.

10. The method as claimed in claim 9, wherein at least two different sets of control parameters are preset for each of the first and second linear sub-controllers, and that the controller is configured to switch each of the first and second linear sub-controllers from one of the different sets of control parameters to another one of the different sets of control parameters.

11. The method as claimed in claim 10, wherein the controller switches the first and second linear sub-controllers from the one set of control parameters to the other set of control parameters based a vehicle operating state.

12. The method as claimed in claim 10, wherein the controller switches the first and second linear sub-controllers from the one set of control parameters to the other set of control parameters based a vehicle driving situation.

13. A traction control system of a vehicle of the type having at least one driven wheel and a drive engine, the traction control system comprising at least one means for detecting at least one wheel-specific characteristic and an electronic controller for controlling a brake pressure of a wheel brake of the at least one driven wheel and a drive torque of the drive engine, the controller having a first linear sub-controller and a second linear sub-controller, the controller configured to generate a combined output control variable according to the method comprising the steps of:

determining at least one wheel-specific characteristic;

from the at least one wheel-specific characteristic, generating in the first linear sub-controller a first suggested output control variable in accordance with a first model driving condition, the first suggested output control variable comprising a first suggested brake output control variable for the wheel brake associated with the driven wheel and a first suggested engine output control variable for the drive engine, from the at least one wheel-specific characteristic, generating in the second linear sub-controller a second suggested output control variable in accordance with a second model driving condition, the second suggested output variable comprising a second suggested brake output control variable for the wheel brake associated with the driven wheel and a second suggested engine output control variable for the drive engine, carrying out a weighted addition of the first and second suggested output control variables based on actual driving conditions to calculate a combined output control variable comprising a combined brake output control variable and a combined engine brake control variable, controlling the wheel brake of the driven wheel according to the combined brake output control variable and the drive engine in according to the combined engine output control variable.

* * * * *

UNITED STATES PATENT AND TRADEMARK OFFICE
CERTIFICATE OF CORRECTION

PATENT NO.        : 8,565,996 B2
APPLICATION NO. : 13/375510
DATED             : October 22, 2013
INVENTOR(S)       : Caspari et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 86 days.

Signed and Sealed this
Fifteenth Day of September, 2015

Michelle K. Lee
*Director of the United States Patent and Trademark Office*